United States Patent
Woirhaye et al.

(10) Patent No.: US 7,730,540 B1
(45) Date of Patent: Jun. 1, 2010

(54) METHOD FOR SCANNING PROTECTED COMPONENTS OF ELECTRONIC MESSAGES

(75) Inventors: Brendon Woirhaye, Whittier, CA (US); Elias Levy, San Francisco, CA (US)

(73) Assignee: Symantec Corporation, Cupertino, CA (US)

( * ) Notice: Subject to any disclaimer, the term of this patent is extended or adjusted under 35 U.S.C. 154(b) by 1211 days.

(21) Appl. No.: 11/007,889

(22) Filed: Dec. 8, 2004

(51) Int. Cl.
G06F 7/04 (2006.01)
G06F 11/30 (2006.01)

(52) U.S. Cl. ........................................ 726/26; 713/188
(58) Field of Classification Search ............. 726/26–30; 713/188
See application file for complete search history.

(56) References Cited

U.S. PATENT DOCUMENTS

| | | | |
|---|---|---|---|
| 6,393,568 B1 | 5/2002 | Ranger et al. | |
| 6,609,196 B1 | 8/2003 | Dickinson, III et al. | |
| 7,448,085 B1 * | 11/2008 | Reyes et al. | 726/26 |
| 2002/0007453 A1 * | 1/2002 | Nemovicher | 713/155 |
| 2004/0083393 A1 * | 4/2004 | Jordan et al. | 713/202 |
| 2006/0015747 A1 * | 1/2006 | Van de Ven | 713/188 |

OTHER PUBLICATIONS

Eugene Kaspersky, Kaspersky Lab: Antivirus Products, 1997-2004.

* cited by examiner

Primary Examiner—Kimyen Vu
Assistant Examiner—Suman Debnath
(74) Attorney, Agent, or Firm—Fenwick & West LLP (57) ABSTRACT

An security module includes a detection module for determining that an electronic message received for scanning includes a protected component. The security module also includes a parsing module for parsing the electronic message to identify potential passwords for the protected component. The security module further includes an analysis module for attempting to access the protected component of the electronic message using the identified potential passwords. A submission module submits potential passwords to a decomposition module for accessing the protected component. If the correct password is found, the decomposition module opens the protected component and/or extracts the contents of the archive. An analyzer module analyzes or scans the contents of the protected component.

22 Claims, 5 Drawing Sheets

METHOD FOR SCANNING PROTECTED COMPONENTS OF ELECTRONIC MESSAGES

BACKGROUND OF THE INVENTION

1. Field of the Invention

This invention pertains in general to computer security, and more specifically to techniques for enabling scanning of protected components of electronic messages for computer viruses or other malicious software.

2. Background Art

Computer systems are continually threatened by a risk of attack from malicious computer code, such as viruses, worms, and Trojan horses. As used herein, "malicious computer code" or "malicious code" is any code that enters a computer without an authorized user's knowledge and/or without an authorized user's consent. Malicious code may or may not include the ability to replicate itself and compromise other computer systems. For example, malicious code may attach itself to files stored by a computer system or use a network to infect other clients through password cracking, buffer overflow attacks, e-mail distribution, etc.

Malicious code can infect a computer in a number of manners. For example, a user might insert an infected disk or other medium into a computer so that the computer becomes infected when the disk files are accessed. Computers connected to networks are also vulnerable to attack. In a network-based attack, malicious code can be transmitted to the computer as an executable program, for example in an attachment to an electronic message. In this example, the malicious code might attack the computer when the user clicks on the electronic message attachment, or the attachment might open automatically when the user reads, or in certain cases previews, the electronic message. In addition, malicious code can even be embedded within the text of the electronic message itself.

Antivirus prevention/detection software can be installed on computers in an attempt to prevent malicious code attacks. For example, antivirus-scanning software scans computer files, including electronic message attachments and electronic messages, to detect the presence of malicious code. When scanning an archive or container of files, such as a .zip file, which might be transmitted to a user as a component of an electronic message, the antivirus scanning software must open up the archive and scan its contents. More recently, however, malicious code has been embedded within an archive or other type of electronic message component that is encrypted and requires entry of a password to open the archive. In some recent cases, the password needed to open the archive has been embedded in the text of the electronic message itself, or some other similar location. In the case of a protected archive that requires entry of a password to be opened, the antivirus scanning software scans the electronic message, but is unable to open the archive to scan its contents without having access to the password. Thus, the antivirus software is unable to detect and eliminate the threat of malicious code that may be hiding within the protected archive.

Therefore, there is a need in the art for a technique that will allow antivirus software to quickly and effectively access and analyze the contents of protected components of electronic messages.

DISCLOSURE OF INVENTION

The above need is met by a security module that can access a protected component of an electronic message by analyzing the text of the electronic message to identify the password for the component. In one embodiment, the security module includes a detection module for determining that an electronic message received for scanning includes a protected component. The security module also includes a parsing module for parsing the electronic message to identify potential passwords for the protected component. The security module further includes an analysis module for attempting to access the protected component of the electronic message using the identified potential passwords. A submission module submits potential passwords to a decomposition module for attempting to access the protected component. If the correct password is found, the decomposition module opens the protected component and/or extracts the contents of the archive. An analyzer module analyzes or scans the contents of the protected component for malicious code.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
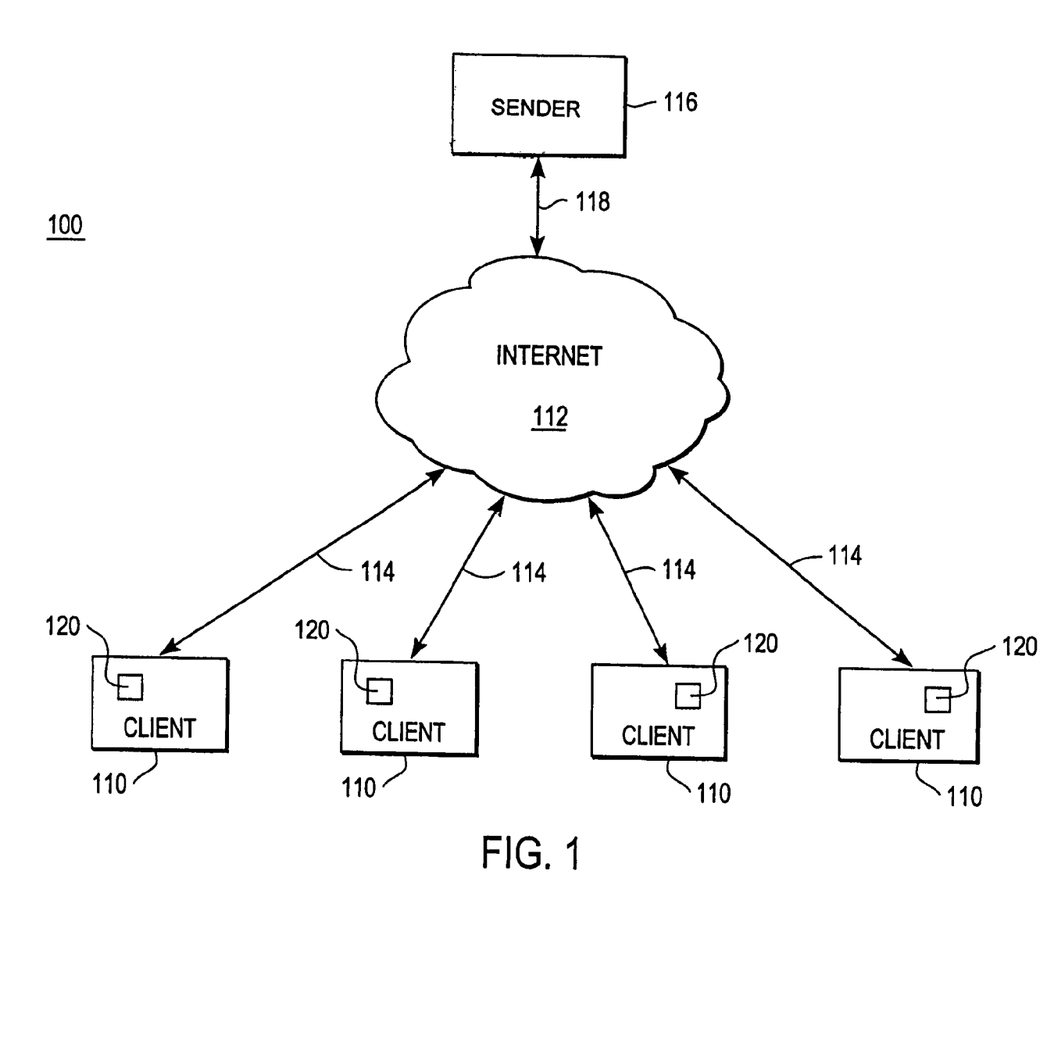
FIG. 1 is a high-level block diagram illustrating an example of a standard computing environment 100, according to one embodiment of the present invention.

FIG. 1 is a high-level block diagram illustrating a computing environment 100 according to an embodiment of the present invention. Multiple client computers 110 are in communication with the Internet 112 or other network, such as a local area network, via communications links 114. Although only four client computers 110 are shown in FIG. 1, there can be thousands or even millions of computer systems coupled to the Internet 112, according to embodiments of the present invention. In one embodiment, the client computers 110 are conventional computer systems. In other embodiments, one or more of the client computers 110 are different electronic devices having Internet connectivity, such as cellular telephones, personal digital assistants (PDAs), etc. A sender 116 is also connected to the Internet 112 via a communications link 118.

As is known in the art, the client computers 110 preferably execute an operating system and one or more application programs. The operating system controls the operation of the computer system, and some examples of such an operating system include LINUX® or one of the versions of MICROSOFT WINDOWS®. Application programs can enable a number of tasks to be performed on the computer system, such as typical tasks involved in sending and receiving electronic messages.

In FIG. 1, each client computer 110 is connected to the Internet via a communications link 114. Preferably, the communications link 114 utilizes conventional networking technology. For example, in one embodiment a client computer 110 uses a modem to connect over standard telephone lines with an Internet Service Provider (ISP) having a high-speed connection to the Internet 112. In another embodiment, a client computer 110 uses a digital subscriber line (DSL) or cable modem to access the ISP via a telephone line or cable television line, respectively. In yet another embodiment, the client computer 110 uses a network card and Ethernet connection to directly connect to the Internet 112. In still other embodiments, the communications link 114 connects the client computer 110 via a wireless 802.11, Bluetooth, or mobile phone (e.g., CDMA or GSM) network. Thus, many different types of technology can be used to provide the functionality of the communications link 114.

As known in the art, the Internet is a large, publicly-accessible network of networks. Individual computers and other devices can utilize communications protocols such as the transmission control protocol/Internet protocol (TCP/IP) to send messages to other computers on the Internet. These messages can use protocols such as the hypertext transport protocol (HTTP), file transfer protocol (FTP), simple mail transport protocol (SMTP), post office protocol 3 (POP3), and internet message access protocol (IMAP), and data representations such as the hypertext markup language (HTML) and extensible markup language (XML) to carry and exchange information. Embodiments of the present invention may use other communications protocols and languages to exchange data.

Another communications link 118 connects the sender 116 to the Internet 112. The sender 116 can send information, such as an electronic message, across the Internet 112 and to the client computers 110. The communications link 118 is generally the same as the communications links 114 connecting the client computers 110 to the Internet 112. Although only one sender 116 and associated communications link 118 are shown in FIG. 1, embodiments of the present invention may have multiple senders and/or links. The sender 116 may be a conventional computer system.

In the embodiment illustrated in FIG. 1, each client computer 110 executes an security module 120 for detecting the presence of a malicious code on the client computer 110. The security module 120 can be a discrete application program, or the security module 120 can be integrated into another application program or the client computer's 110 operating system. In one embodiment, the security module 120 is configured to execute and monitor the client computer 110 at all times when the client computer 110 is active. In another embodiment, the security module 120 is adapted to check for malicious code in response to a specific command from a user of the client computer 110 or in response to another event. The security module 120 can be configured to monitor for a variety of types of malicious code, including viruses, Trojan horses, and/or worms. The security module 120 may be adapted to be included as a part of a standard antivirus scanner, as a part of another malicious code detection system, or as a standalone system.

The security module 120 is adapted for analysis of electronic messages and protected components of electronic messages. The term "electronic message," as used herein, includes electronic mail (e-mail), instant messaging service (IMS) messages, text messages or short messaging service (SMS) messages, multimedia messaging services (MMS) messages, electronic fax messages, and the like. As used herein in reference to a protected component, the term "protected" includes password-protection, encryption with a key, or both, or other similar types of protection methods. Thus, a "protected component," as used herein, is any type of file that is associated with an electronic message and that is "protected," including an e-mail attachment or other type of attachment, an archive or container of files (e.g., a .zip file), an embedded file, a self-installing executable file, a self-extracting file that requires a password (e.g., a password-protected self installing executable file), and the like. As used herein, the term "password" refers not only to a password that might be used to access a protected component, but also refers to a decryption key, or to both a password and a decryption key for accessing a protected component.

Figure 2:
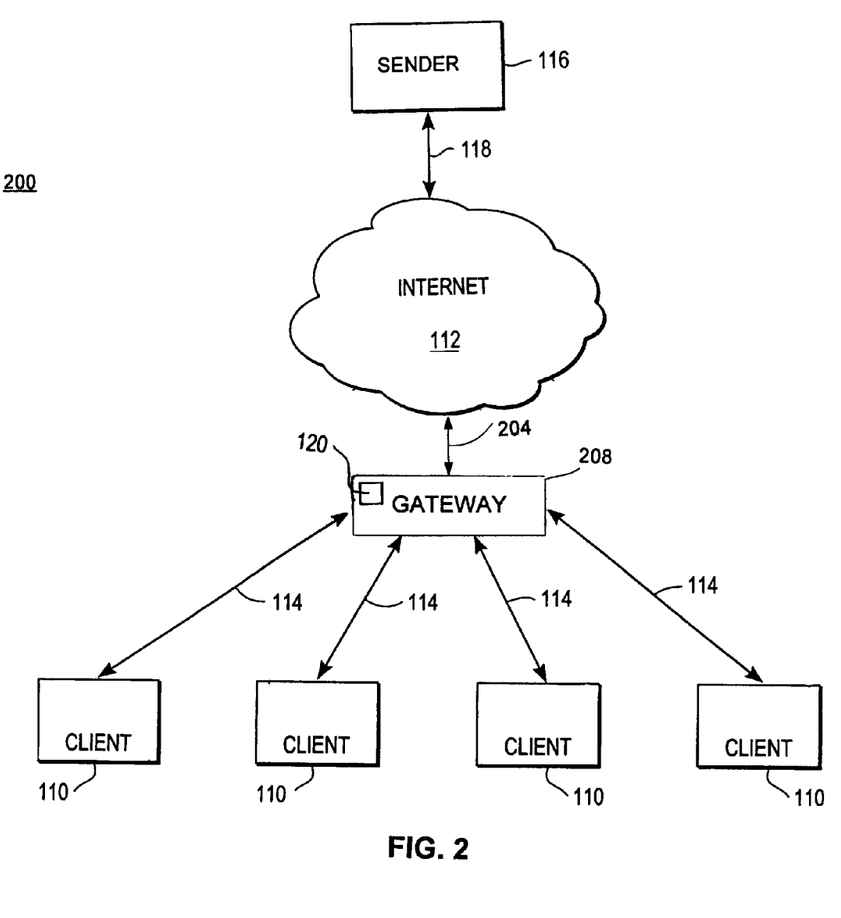
FIG. 2 is a high-level block diagram illustrating an example of a standard business computing environment 200 including a gateway, according to one embodiment of the present invention.

FIG. 2 is a high-level block diagram illustrating a computing environment 200 including a gateway, according to an embodiment of the present invention. Multiple client computers 110 and a sender 116 are shown. In FIG. 2, the client computers 110 are in communication with the gateway 208 via communications links 114, and the gateway is in communication with the Internet 112 or other network via communication link 204. The sender 116 is also connected to the Internet 112 via a communications link 118.

As described in reference to FIG. 1, the security module 120 on the gateway 208 can be a discrete application program, or the security module 120 can be integrated into another application program or the operating system. In one embodiment, the security module 120 is configured to monitor inbound and outbound traffic at all times when the gateway 208 is active. In another embodiment, the security module 120 is adapted to check for malicious code in response to a specific command or some other event.

The sender 116 sends electronic messages to the client computers 110, as described with regard to FIG. 1. However, unlike FIG. 1 in which the security module 120 executes primarily on the client computer 110 for detecting the presence of malicious code on the client computer 110, the security module 120 of the embodiment of FIG. 2 executes primarily on the gateway system 208. An example of a gateway 208 includes a departmental server, such as a server that runs in an accounting department of an enterprise and filters information passing into and out of the accounting department. In FIG. 2, the gateway 208 can check inbound information traffic, outbound information traffic, traffic between the client computers 110 on the internal network, etc. Thus, the gateway 208 can monitor electronic messages sent to the client computers 110, by the sender 116 for example, and the gateway 208 can monitor electronic messages sent out by the client computers 110. In some embodiments, the security module 120 executes on both the client computers 110 and on the gateway 208.

Figure 3:
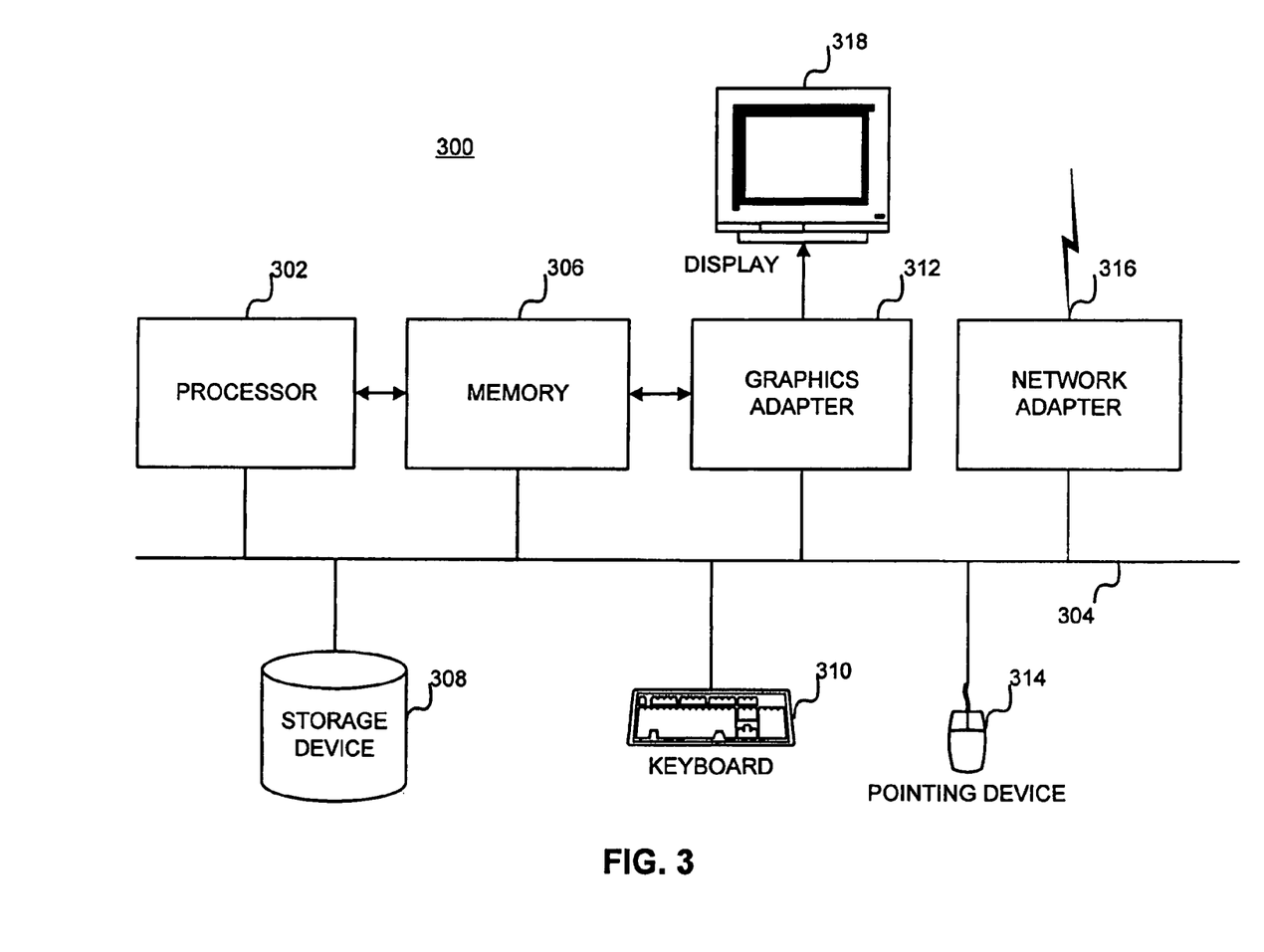
FIG. 3 is a high-level block diagram illustrating a standard computer system 300 for use with the present invention.

FIG. 3 is a high-level block diagram illustrating a functional view of a typical computer system 300 for storing and executing a security module 120, according to one embodiment of the present invention. This computer system 300 can act as a client computer 110, or a gateway system 208, as shown in FIGS. 1 and 2. However, one or more of the components of the computer system 300 may be missing or modified in the client computer 110 and/or the gateway system 208. Illustrated is a processor 302 coupled to a bus 304. Also coupled to the bus 304 are a memory 306, a storage device 308, a keyboard 310, a graphics adapter 312, a pointing device 314, and a network adapter 316. A display 318 is coupled to the graphics adapter 312.

The processor 302 may be any general-purpose processor such as an INTEL x86, SUN MICROSYSTEMS SPARC, or POWERPC compatible-CPU, or the processor 302 may also be a custom-built processor. The memory 306 may be, for example, firmware, read-only memory (ROM), non-volatile random access memory (NVRAM), and/or RAM, and holds instructions and data used by the processor 302. The storage device 308 is, in one embodiment, a hard disk drive but can also be any other device capable of storing data, such as a writeable compact disk (CD) or DVD, and/or a solid-state memory device. The pointing device 314 may be a mouse, track ball, or other type of pointing device, and is used in combination with the keyboard 310 to input data into the computer system 300. The graphics adapter 312 displays images and other information on the display 318. The network adapter 316 couples the client computer 110 and/or gateway 208 with the Internet 112. As stated previously, one or more of the components of the computer system 300 may be missing or modified. For example, the system can be a security gateway machine that has a RAM and a processor, but no video or storage devices, or pointing devices, etc.

As is known in the art, the computer system 300 is adapted to execute computer program modules for providing functionality described herein. In this description, the term "module" refers to computer program logic for providing the specified functionality. A module can be implemented in hardware, firmware, and/or software. Where the any of the modules described herein are implemented as software, the module can be implemented as a standalone program, but can also be implemented in other ways, for example as part of a larger program, as a plurality of separate programs, or as one or more statically or dynamically linked libraries. It will be understood that the modules described herein represent one embodiment of the present invention. Certain embodiments may include other modules. In addition, the embodiments may lack modules described herein and/or distribute the described functionality among the modules in a different manner. Additionally, the functionalities attributed to more than one module can be incorporated into a single module. In one embodiment of the present invention, the modules form a computer program product and are stored on a computer-readable storage medium such as the storage device 308, loaded into the memory 306, and executed by the processor 302. Alternatively, hardware or software modules may be stored elsewhere within the computer system 300.

Figure 4:
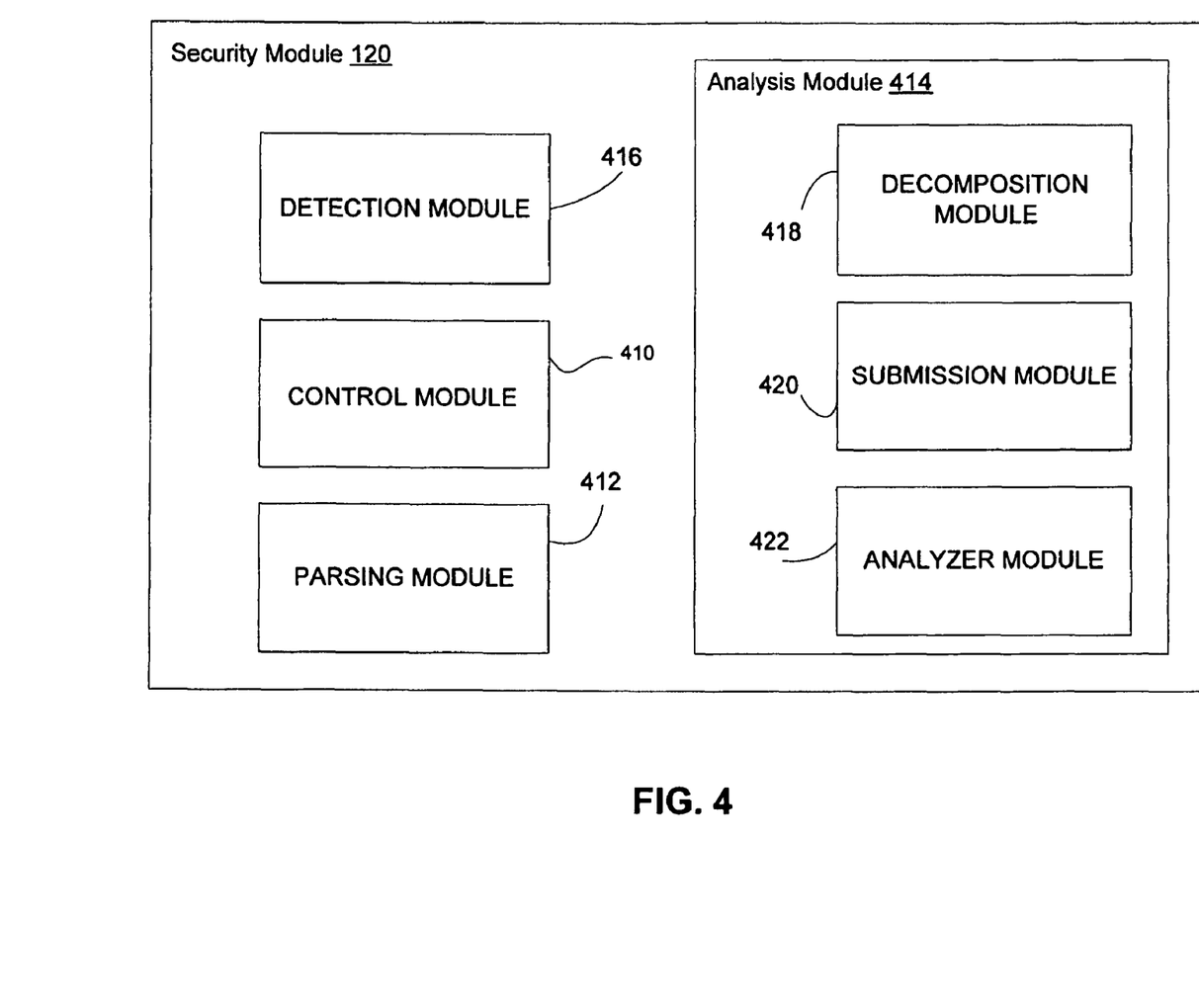
FIG. 4 is a high-level block diagram illustrating the functional modules within the security module 120, according to one embodiment of the present invention.

FIG. 4 is a high-level block diagram illustrating the functional modules within the security module 120, according to one embodiment of the present invention. The security module 120, in the embodiment illustrated in FIG. 4, includes a control module 410, a detection module 416, a parsing module 412, and an analysis module 414. The analysis module further includes a decomposition module 418, a submission module 420, and an analyzer module 422.

The control module 410 directs the general operations of the security module 120. In some embodiments, the control module 410 receives notification from the detection module 416 when an electronic message with a protected component has been received. In some embodiments, the control module 410 notifies the parsing module 412 that an electronic message with a protected component has been received. The control module 410 can be notified by the parsing module 412 as potential passwords for accessing the contents of the protected component are identified. In some embodiments, the control module 410 can call the analysis module 414 to request that the analysis module 414 begin attempting to access the protected component of the electronic message. The control module 410 can also notify the analysis module 414 of the potential passwords as they are identified by the parsing module 412. In some embodiments, the control module 410 receives notification from the analysis module 414 when the correct password for accessing the contents of the component has been identified. The control module 410 can then notify the parsing module 412 to end the parsing of the electronic message.

The detection module 416 determines when an electronic message with a protected component has been received for analysis by the computer executing the security module 120. In some embodiments, the detection module 416 first detects that an electronic message with an attached component has been received, and the detection module 416 attempts to open the component. If the component is protected, the detection module 416 can then notify the control module 410 that the component is protected and requires a password to be opened.

The parsing module 412 parses the electronic message to identify potential passwords to access the contents of a protected component of an electronic message. The control module 410 notifies the parsing module 412 that an electronic message with a protected component has been received. The parsing module 412 can also notify the control module 410 as potential passwords are identified. In some embodiments, the parsing module 412 parses the text of the electronic message to identify potential passwords for the protected component. For example, if an e-mail containing a protected e-mail attachment that is infected with malicious code is sent to a user, the sender may also include within the text of the e-mail the password that the user must submit to access the protected attachment. Thus, the e-mail text itself may contain the word or phrase necessary to open the attachment and access its contents. As the parsing module 412 identifies potential passwords, the parsing module 412 notifies the control module 410, which passes on the information to the analysis module 414 for use in attempting to access the protected component.

In some embodiments, the parsing module 412 iterates through some or all of the text of the electronic message to identify potential passwords for the protected component. The parsing module 412 breaks the text down into discrete pieces or segments, each of which could potentially be a password. As one example, the text can be broken up into successive words, and each word can be submitted as a password. In this example, the phrase "the password is malicious" contains four words and each of the four words of the phrase would be submitted as a potential password. Alternatively, more than one word could be submitted at a time. In addition, it is possible to divide up the text of an electronic message by characters, and successive groups of characters can be submitted as potential passwords. For example, in three-character successive analysis of the phrase "the password is malicious," the text parsing module 412 might submit "the," "hep," "epa," "pas," etc., until all successive three character groups have been tried. Additionally, the text analysis does not have to be limited to alphabetic character analysis. The parsing module 412 can also consider numerical characters, punctuation marks, symbols, white space, blanks, horizontal tabs, and the like. These characters found within the electronic message text can be parsed and submitted in a variety of combinations as potential passwords. The parsing module can also include case-sensitive passwords, null passwords (a password that is blank or null), passwords with obvious misspellings (i.e., a password that is misspelled in the electronic message text, but that is intended to be correctly spelled by the user when the password is applied to open a protected component), and other various types of passwords. As an additional embodiment, the system 100 might also have access to a user-supplied or a vendor-supplied list of potential passwords (e.g., a collection of common passwords, a dictionary, a thesaurus, etc.).

In some embodiments, the parsing process will continue until a password is found, or until the various parts of the electronic message text have been unsuccessfully tested in various combinations as potential passwords. In other embodiments, the security module 120 will have a predefined set of different ways to parse the text and a set order by which each of these tests will be carried out. In some embodiments, the parsing module 412 will display a dialog box or some other form of alert to prompt the user to insert the password. If the user can discern what the password is from the electronic message text or some other source, the user can provide the password to allow the security module 120 to scan the protected component. This dialog box can be displayed before or after parsing the text for passwords, or during the parsing of the text. The examination of different potential passwords will continue until all of these various tests have been applied and the text has been parsed according to the predefined methods. As described above, if the security module 120 is unable to determine the correct password by parsing the electronic message text, the security module 120 can prompt the user to insert the password. If this is unsuccessful, the security module 120 can notify the user that the component cannot be scanned, and the user can decide whether or not to open the component and risk possible infection.

The analysis module 414 attempts to access the protected component of the electronic message using the potential passwords identified by the parsing module 412. The analysis module 414 receives notification from the control module 410 to begin attempting to access the protected component of the electronic message, and is provided by the control module 410 the potential passwords as they are identified by the parsing module 412. The analysis module 414 can also notify the control module 410 when the correct password for accessing the contents of the component has been identified. As stated above, the analysis module 414 includes a submission module 420, a decomposition module 418, and an analyzer module 422, in some embodiments.

The submission module 420 receives potential passwords provided to the analysis module 414, and the submission module 420 submits potential passwords to the decomposition module 418 for attempting to open the protected component. The submission module 420 can submit each potential password as the password is provided to the submission module 420. The submission module 420 can also be configured to combine one or more passwords and submit the combination to the decomposition module 418 as a potential password. When the correct password has been submitted to the decomposition module 418 for accessing the contents of the component, the decomposition module 418 can notify the submission module 420 to stop providing potential passwords.

The decomposition module 418 of the analysis module 414 attempts to open the protected component and access its contents using each password submitted to the decomposition module 418 by the submission module 420. The decomposition module 418 also notifies the submission module 420 and the analyzer module 422 when the contents of the protected component have been successfully accessed. If the component is an archive or container of files, the decomposition module 418 attempts to open the archive and extract the files in the archive. In some embodiments, the decomposition module 418 extracts the files from the archive, and places them in a temporary folder for further analysis. In some embodiments, the decomposition module 418 is a program for decompressing a container of files, such as a program for opening .zip files. In other embodiments, the decomposition module 418 is separate from the decompression program, but is configured to direct the decompression program to decompress a file and extract its contents.

The analyzer module 422 of the analysis module 414 analyzes or scans the contents of the component once the correct password has been identified and the decomposition module 418 is able to open the protected component. In some embodiments, the analyzer module 422 is a typical antivirus scanner or scan engine that scans the component for malicious code. Commonly, such antivirus scanners use known malicious code signatures to recognize malicious code hidden within a component.

Figure 5:
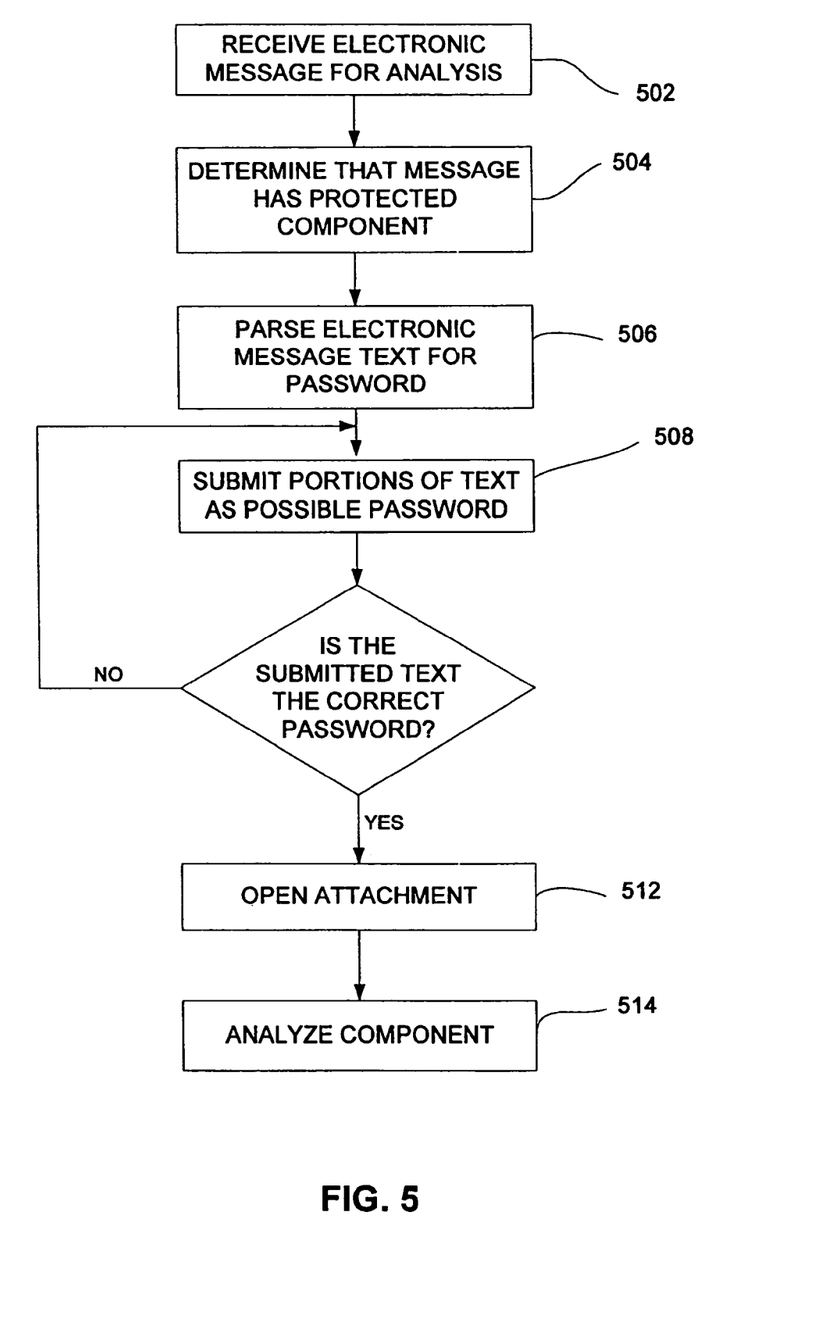
FIG. 5 is a flowchart illustrating steps performed to access a protected component of an electronic message, according to one embodiment of the present invention.

Referring now to FIG. 5, there is shown a flowchart illustrating the operation of the security module 120, according to some embodiments of the present invention. It should be understood that these steps are illustrative only. Different embodiments of the security module 120 may perform the illustrated steps in different orders, omit certain steps, and/or perform additional steps not shown in FIG. 5.

The security module 120 receives 502 an electronic message for analysis. The security module 120 may then determine 504 that the electronic message includes a protected component. In some embodiments, the security module 120 then parses 506 the text of the electronic message for a potential password. As described above, the security module 120 divides the text of the electronic message into defined segments, and submits 508 each portion of the electronic message text as a possible password. If the segment of text is not the correct password, the security module 120 submits another segment of text that was identified as a possible password. In some embodiments, the security module 120 continues iterating through the text of the electronic message, and trying different variations of words and characters as potential passwords. If the segment of text submitted is the correct password, the security module 120 then opens 512 the component and analyzes 514 its contents for malicious code. If malicious code is found, the security module may quarantine the infected file or otherwise eliminate the threat as suitable.

The method described herein may also be used to analyze outbound messages for confidential information. In some embodiments, the security module 120 is configured to analyze electronic messages that a user sends out. The security module 120 is adapted to search such messages for potentially confidential information that may have been included in a component of the electronic message. The security module 120 functions similarly to that described above in relation to analyzing inbound electronic messages for malicious code, however in this case the security module 120 is analyzing for confidential information rather than malicious code. The control module 410 controls the operations of the various modules included in the security module 120. The detection module 416 detects that outbound message has been received 502 and determines 504 that the message contains a protected component, as described in reference to FIGS. 4 and 5. The parsing module 412 parses 506 of the electronic message in search of potential passwords in a manner as described above. The analysis module 414 then attempts to access the protected component using the identified potential passwords. The submission module 420 will submit 508 to the decomposition module 418 potential passwords identified by the parsing module 412. If successful in submitting the correct password, the decomposition module 418 opens 512 the protected component and extracts its contents, if necessary. The analyzer module 422 then analyzes 514 the contents of the component for the presence of confidential information.

Similar to an antivirus scanner, the confidential information analyzer can be configured to search the component for confidential information based on defined signatures. In some embodiments, the analyzer module 422 is adapted to scan the components for words commonly associated with confidential text, such as "confidential" or "proprietary." In some embodiments, the analyzer module 422 can also be configured by the user to search for words or phrases specifically identified by the user. For example, the analyzer module 422 can be configured to search for company specific information that is typically associated with company trade secrets. Certain key company words or phrases can be flagged for further analysis. In some embodiments, if a key word is found in the text, the user can be alerted and prompted to review the content and determine whether or not the component contains confidential information. Thus, the user can be notified if confidential information has been inadvertently included in the electronic message.

The confidential information analyzer may also be adapted to change the contents of the protected component in which confidential information is identified. For example, the confidential information might be erased, blacked out, replaced with the term "confidential," or otherwise modified. The user might also be given the option of choosing how the confidential information should be dealt with. The user may be asked to choose an option each time confidential information is found. Alternatively, the user could be given an option in advance, before the analyzer is used, thus allowing the user to set his or her preference for dealing with all confidential information found in the future.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer program product comprising a non-transitory computer-readable storage medium having executable computer program logic embodied therein for accessing contents of a protected component of an electronic message, the computer program logic comprising:
   a detection module for determining that an electronic message received for analysis includes a protected component;
   a parsing module for parsing the electronic message to identify potential passwords for the protected component, the parsing comprising dividing text of the electronic message on word boundaries into word segments and identifying the word segments as potential passwords for the protected component; and
   an analysis module for attempting to access the protected component of the electronic message using the identified potential passwords and for accessing contents of the protected component when a correct password is identified.

2. The computer program product of claim 1, wherein the parsing module is adapted to provide a dialog box to a user for entry of a password.

3. The computer program product of claim 1, wherein the analysis module comprises:
   a decomposition module for using an identified potential password to open the protected component.

4. The computer program product of claim 3, wherein the analysis module comprises:
   a submission module for submitting the potential passwords to the decomposition module for opening the protected component.

5. The computer program product of claim 4, wherein the analysis module comprises:
   an analyzer module for analyzing contents of the protected component opened by the decomposition module.

6. The computer program product of claim 5, wherein the analyzer module scans the protected component for the presence of malicious code.

7. The computer program product of claim 1, wherein the parsing module identifies additional potential passwords responsive to the attempts of the analysis module to access the protected component using the identified potential passwords being unsuccessful.

8. The computer program product of claim 1, wherein the analysis module further attempts to access the protected component of the electronic message using potential passwords derived at least in part by reference to a known list of potential passwords.

9. A computer-implemented method of accessing contents of a protected component of an electronic message, comprising:
   determining that an electronic message received for scanning includes a protected component;
   parsing the electronic message to identify potential passwords for the protected component, the parsing comprising dividing text of the electronic message on word boundaries into word segments and identifying the word segments as potential passwords for the protected component; and
   attempting to access the protected component of the electronic message using the identified potential passwords and for accessing contents of the protected component when a correct password is identified.

10. The method of claim 9, wherein parsing the electronic message further comprises:
    providing a dialog box to a user for entry of a password.

11. The method of claim 9, wherein attempting to access the protected component further comprises:

extracting the contents of the protected component using an identified potential password; and scanning the extracted contents of the protected component.

12. The method of claim 9, further comprising identifying a password to open the protected component;

opening the protected component; and analyzing contents of the protected component.

13. The method of claim 12, wherein analyzing contents of the protected component further comprises:

scanning the protected component for the presence of malicious code.

14. The method of claim 9, further comprising:

submitting at least one of the identified word segments of the text of the electronic message as a password for the protected component.

15. A computer system for accessing contents of a protected component of an electronic message, comprising:

a non-transitory computer-readable storage medium storing executable software modules, comprising:

a detection module for determining that an electronic message received for scanning includes a protected component;

a parsing module for parsing the electronic message to identify potential passwords for the protected component, the parsing comprising dividing text of the electronic message on word boundaries into word segments and identifying the word segments as potential passwords for the protected component;

an analysis module for attempting to access the protected component of the electronic message using the identified potential passwords and for accessing contents of the protected component when a correct password is identified; and a processor configured to execute the software modules stored by the computer readable storage medium.

16. The system of claim 15, wherein the parsing module is adapted to provide a dialog box to a user for entry of a password.

17. The system of claim 15, wherein the analysis module comprises:

an analyzer module for analyzing contents of the protected component that have been accessed using the identified correct password.

18. The system of claim 15, wherein the analysis module comprises:

a decomposition module for extracting the contents of the protected component using an identified potential password; and an analyzer module for scanning the contents of the protected component.

19. The system of claim 15, wherein the analysis module comprises:

a decomposition module for using an identified potential password to open the protected component.

20. The system of claim 19, wherein the analysis module comprises:

a submission module for submitting the potential passwords to the decomposition module for opening the protected component.

21. The system of claim 20, wherein the analysis module comprises:

an analyzer module for analyzing contents of the protected component opened by the decomposition module.

22. The system of claim 21, wherein the analyzer module scans the component for the presence of malicious code.

* * * * *